(No Model.)
M. JAKOBSON.
TANDEM ATTACHMENT FOR BICYCLES.
No. 579,982. Patented Apr. 6, 1897.
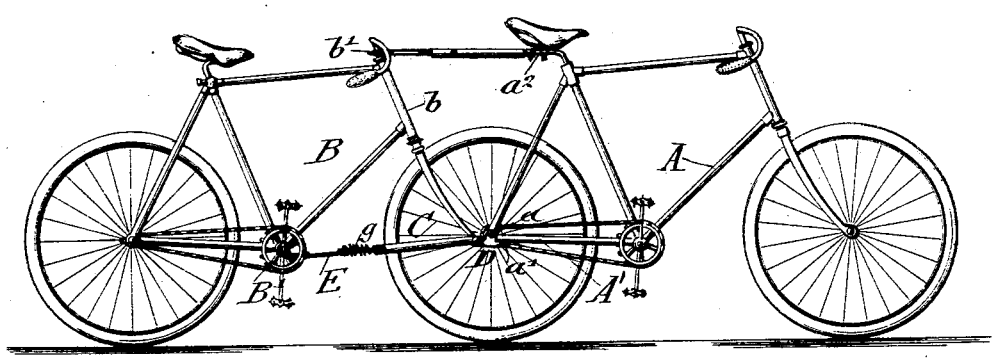
Fig. 1.
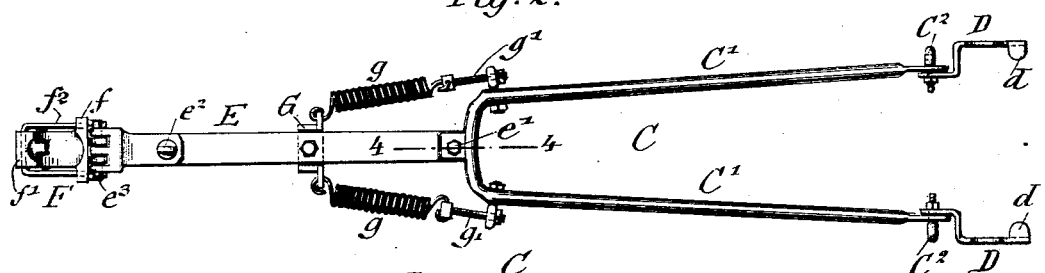
Fig. 2.
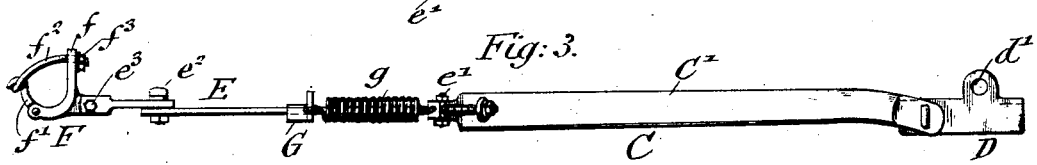
Fig. 4.   Fig. 3.
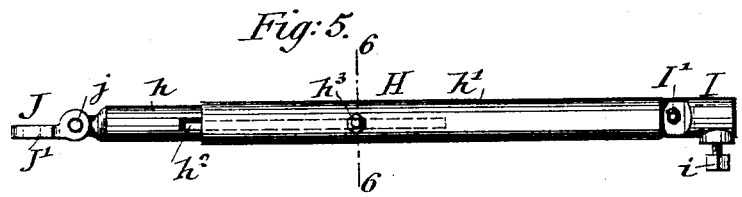
Fig. 5.
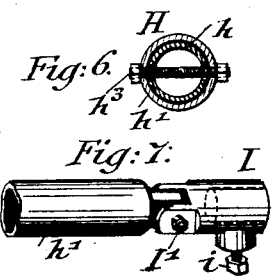
Fig. 6.
Fig. 7.
WITNESSES:
George W. Jackel
O. C. Cost
INVENTOR
Max Jakobson
BY
Goepel & Raegener
ATTORNEYS.
THE NORRIS PETERS CO., PHOTO-LITHO., WASHINGTON, D. C.

UNITED STATES PATENT OFFICE.

MAX JAKOBSON, OF NEW YORK, N. Y.

TANDEM ATTACHMENT FOR BICYCLES.

SPECIFICATION forming part of Letters Patent No. 579,982, dated April 6, 1897.

Application filed September 9, 1895. Serial No. 561,881. (No model.)

*To all whom it may concern:*

Be it known that I, MAX JAKOBSON, a citizen of the United States, residing in the city, county, and State of New York, have invented certain new and useful Improvements in Tandem Attachments for Bicycles, of which the following is a specification.

My invention relates to attachments whereby two ordinary safety-bicycles may be coupled together so that they may be used as a single tandem machine having three wheels, the front wheel of one of the bicycles being removed in order to enable the proper coupling of the machine, and particularly relates to improvements on the invention covered by my application filed March 29, 1895, Serial No. 543,644; and my invention consists of tandem attachments for bicycles comprising, first, a coupling device for the lower parts of the frames of the machines which are connected and a coupling device for the upper parts thereof, said coupling devices being jointed so as to permit the proper movement and steerage of the tandem cycle, and, second, a three-wheeled tandem cycle which comprises an ordinary safety-bicycle, an ordinary bicycle-frame provided with the usual rear driving-wheel, seat, and handle-bar, the front wheel of which is removed and the front fork connected to the rear axle of the front bicycle, and jointed coupling devices for the two frames, as will be described hereinafter and finally pointed out in the claims.

In the accompanying drawings, Figure 1 is a side elevation of a three-wheeled tandem cycle embodying my invention. Fig. 2 is a plan view of the lower coupling device. Fig. 3 is a side elevation of the same. Fig. 4 is a section on line 4 4, Fig. 2. Fig. 5 is a side view of the upper coupling device. Fig. 6 is a transverse section on line 6 6, Fig. 5; and Fig. 7 is a detail perspective view of one end of the lower coupling device.

Similar letters of reference indicate corresponding parts.

In the drawings, A indicates an ordinary safety-bicycle, which may be either of a gentleman's or a lady's type, and B represents a portion of another bicycle, the front wheel thereof being removed in order that it may be supported by means of its front fork $b$, as shown, upon the rear axle $a$ of the machine, as will be hereinafter described. With the exception of the removal of the front wheel of the rear bicycle B the other parts remain the same.

The lower coupling device for the forward and rear frames consists of a fork C, the bifurcated arms C' of which diverge slightly, while to the outer ends of said arms are pivoted at $C^2$ rest-plates D, which are provided with inwardly and laterally extending flanges or lips $d$.

E is a link which is made in two sections connected by a pivot $e^2$, and is pivoted to the cross-bar of fork C by means of a pivot-pin $e'$. Pivoted to the other end of the link E at $e^3$ is a clip F, which may be of any suitable construction, but which in the present instance is shown as consisting of a head-piece $f$, a hook $f'$, pivoted to the lower part of the head-piece $f$, and a U-shaped tie-piece $f^2$, with which the hook-shaped piece $f'$ engages, said U-shaped tie-piece having screw-threaded shanks which pass through openings in the head-piece $f$ and on which are screwed nuts $f^3$, whereby the clip may be tightened. Fixed to the link E is a cross-bar G, which by means of spiral springs $g$ and tie-bolts $g'$ is connected at its opposite ends to the cross-bar of the fork C.

The upper coupling H consists of tubular telescopic sections $h\ h'$, which slide one within the other, the inner tubular section $h$ being provided with longitudinal slots $h^2$ in its opposite sides and the outer tubular section carrying a pin $h^3$, that extends through the slots $h^2$, so that the inner tubular section $h$ is guided longitudinally in the outer tubular section $h'$, but cannot be relatively turned therein. A socket I, provided with a set-screw $i$, is pivoted at I' to the outer end of the outer tubular section $h'$, while to the outer end of the inner tubular section $h$ is pivoted or hinged at $j$ a plate J, which is provided with a central opening J'.

Being provided with two ordinary safety-bicycles, whether they may be a lady's or a gentleman's bicycle, it is only necessary to be further provided with the attachments above described in order to convert said machines into a three-wheeled tandem cycle. To do this, it is first necessary to pass the axle of the driving-wheel of the front bicycle A through openings $d'$, formed in the plates D of the lower coupling attachment, then tighten up the nuts of said rear axle $a$, and then pass the pivot-bolts $C^2$ through the lower openings of the front fork $b$ of the frame of the rear bicycle, and finally secure the clip F over the box or portion of the rear frame in which the pedal-shaft B' turns. In applying the lower coupling attachment care is to be taken that the lips $d$ of the rest-plates D thereof engage under the lower bars A' of the front bicycle, as shown at $a'$, in order that the rest-plates D will be pressed against the bars A' by the weight placed upon the fork $b$ and upon the arms C' of the fork C. To apply the upper coupling device H, the socket-piece I is caused to receive the rear end of the saddle-post $a^2$ of the front bicycle, while the nut $b'$ over the shank of the steering-fork $b$ of the rear frame is removed, so that the plate J may be applied onto the same, after which the nut is again replaced and screwed down tightly. It will now be seen that when in operation the three-wheeled tandem cycle above described will be permitted to freely turn corners, pass over elevations, up hills, and in fact serve to carry the cyclists over any ground which an ordinary bicycle can pass over by reason of the pivot-point construction of the coupling attachments.

The pivotal connections $e'$ and $e^2$ of the lower coupling device permit the tandem machine to turn curves, while the pivot-joints $C^2$ and $e^3$ of the lower coupling device and the pivotal connections $j$ and I' of the upper coupling device permit the parts of the machine to rise and fall over the irregularities of the ground. In passing over irregularities of the ground the saddle-post of the forward bicycle approaches or recedes from the steering-fork of the rear frame, this movement being permitted by reason of the inner tubular section $h$ of the upper coupling device sliding in and out of the outer tubular section $h'$. Being provided with my improved coupling attachments, two cyclists can readily couple their machines together and enjoy a ride the same as on an ordinary two-wheeled bicycle, the middle wheel of the three-wheeled tandem cycle affording additional strength and support for the machine and riders.

Another advantage in a three-wheeled tandem cycle over the ordinary two-wheeled tandem is that the shock to the riders is not so great, as the vibrations in the machine are distributed over the three wheels, the center wheel receiving the vibrations as well as the end wheels.

Having thus described my invention, I claim as new and desire to secure by Letters Patent—

1. A three-wheeled tandem cycle, consisting of an ordinary safety-bicycle at the front of the same, an ordinary safety-bicycle, without the front wheel, at the back of the same and supported by the rear axle thereof, by means of its front fork, and a pivot-jointed coupling attachment between the front and rear frames, substantially as set forth.

2. The herein-described lower coupling attachment for cycles, consisting of a fork provided at the ends of its arms with pivoted plates having inwardly-extending lips, and means for pivotally connecting the other end with the pedal-shaft, substantially as set forth.

3. The herein-described lower coupling attachment for cycles, consisting of a fork provided at the ends of its arms with pivoted plates having inwardly-extending lips, a link pivoted to the fork, a clip hinged to the link, and springs connecting the link with the fork, substantially as set forth.

4. The herein-described upper coupling device for cycles, consisting of telescoping sections, a socket-piece provided with a set-screw and pivoted to one of the sections, and a plate having an opening and pivoted to the other section, substantially as set forth.

In testimony that I claim the foregoing as my invention I have signed my name in presence of two subscribing witnesses.

MAX JAKOBSON.

Witnesses:
   H. WILLARD GRIFFITHS,
   GEO. L. WHEELOCK.